UNITED STATES PATENT OFFICE.

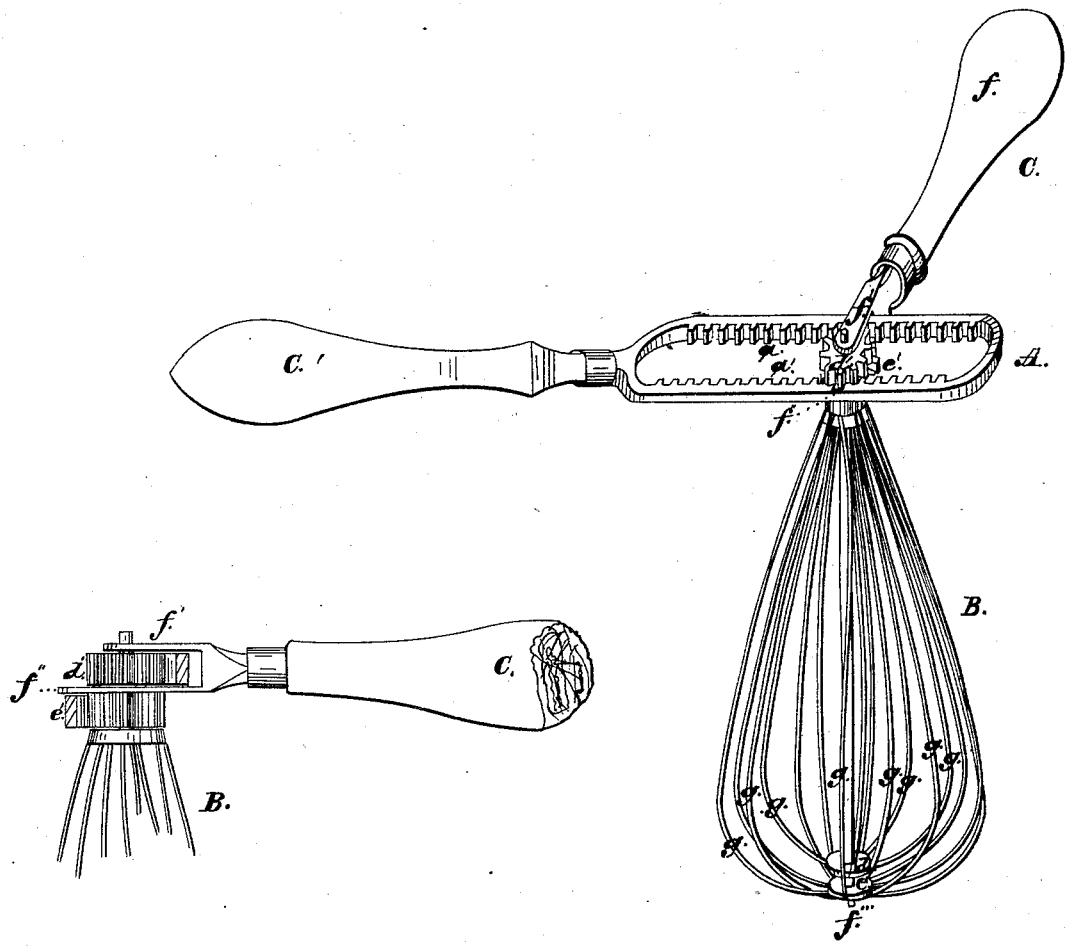

SYLVENUS WALKER, OF BOSTON, MASSACHUSETTS, ASSIGNOR TO WILLIAM P. SPENCE, OF SAME PLACE.

EGG-BEATER.

Specification of Letters Patent No. 26,958, dated January 24, 1860.

*To all whom it may concern:*

Be it known that I, SYLVENUS WALKER, of Boston, county of Suffolk, and State of Massachusetts, have invented a new and Improved Egg-Beater.

I hereby declare that the following is a full and exact description thereof reference being had to the accompanying drawings, and to the references, marked thereon.

The nature of this invention consists in the arrangement and combination of the rack piece with the rotating beaters hereinafter described.

In the accompanying drawings let the letter A represent the rack piece.

B is the rotary pear shaped beaters; C, C', the two handles.

(a) represents the teeth on the one side of the rack piece. (a') represents the teeth on the other side of the rack piece.

(e) represents the disk of the outer range of the beater; (g) the wires of the outer beaters; (d) the disk of the inner beaters in which the wires, g', are received; (g') the wires of the inner beaters.

(d') is the pinion meshing into the teeth (a) and operating the inner beaters.

(e') is the lower pinion operating the outer beaters.

(f') is the upper projection of the forked shank piece of the handle (C).

(f'') is the end of the lower shank projection, which is received under rack teeth (a) and projects on the top of the rack piece above the teeth (a') and forms a separating plate between the upper pinion (d') and the lower pinion (e').

(f''') represents the central rod or shaft, which passes through the disk or central pieces (e) (d) and pinions (e') and (d'), and on this shaft the two ranges of beaters turn but in opposite directions, by reason of each pinion being operated only by those teeth on its own side of the rack piece.

It will be remarked in regard to the rack piece A, that when the beaters be set vertically, the side of the rack piece (a) will be higher than side (a') but the frame of the rack will stand oblique to the horizon, that is (a) side will be as much higher than (a') side, as the equal to the thickness of the pinion, or equal to the length of the pinion teeth, thus holding the rack in an oblique position, or constructing it to operate in this manner constitutes an important feature in the invention.

The machine is operated in the following manner: The beaters are plunged vertically into a suitable vessel containing the necessary quantity of eggs. The handle (C) is grasped and held firmly in the left hand, while the handle (C') is held rather loosely in the right hand and vibrated back and forth, by which movement the beaters are rotated but in opposite directions.

It is not contended that the use of two pear shaped egg beaters one within the other is a patentable novelty, nor the vibrating of egg beaters by means of a rack and pinions as these devices have been already used; but the arranging of the two sides of the rack piece at different elevations, one of which corresponds to the height of the upper pinion (e'), and the other to that of the lower pinion (d',) presents a feature not hitherto found in any such apparatus.

Therefore what I claim as my invention and desire to secure by Letters Patent, is—

The arrangement and combination of the oblique rack and pinions, operating in the manner and for the purpose substantially as set forth.

SYLVENUS WALKER. [L. S.]

Witnesses:
JOHN J. PRESCOTT,
WM. P. SPENCE.